United States Patent
Song et al.

(10) Patent No.: US 11,526,689 B2
(45) Date of Patent: Dec. 13, 2022

(54) FEW-SHOT LEARNING OF REPETITIVE HUMAN TASKS

(71) Applicant: Robert Bosch GmbH, Stuttgart (DE)

(72) Inventors: Huan Song, San Jose, CA (US); Liu Ren, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 445 days.

(21) Appl. No.: 16/720,896

(22) Filed: Dec. 19, 2019

(65) Prior Publication Data

US 2021/0192278 A1 Jun. 24, 2021

(51) Int. Cl.
*G06K 9/62* (2022.01)
*G06F 3/01* (2006.01)
*G06N 3/04* (2006.01)

(52) U.S. Cl.
CPC .......... *G06K 9/6256* (2013.01); *G06F 3/014* (2013.01); *G06N 3/049* (2013.01)

(58) Field of Classification Search
CPC ............. G06K 9/6256; G06K 9/00536; G06K 9/6268; G06F 3/014; G06N 3/049; G06N 3/0445; G06N 3/0454; G06N 3/08; G06V 10/82; G06V 40/20
USPC .......................................................... 706/2
See application file for complete search history.

(56) References Cited

U.S. PATENT DOCUMENTS

| | | | |
|---|---|---|---|
| 9,424,512 B2 * | 8/2016 | Hawkins | G06N 3/049 |
| 10,877,558 B1 * | 12/2020 | Zhao | G06F 3/017 |
| 2020/0234083 A1 * | 7/2020 | Farivar | G06K 9/6273 |

FOREIGN PATENT DOCUMENTS

WO WO-2021066796 A1 * 4/2021 ......... G06Q 10/0639

OTHER PUBLICATIONS

Fei-Fei, Li, Rob Fergus, and Pietro Perona. "One-shot learning of object categories." IEEE transactions on pattern analysis and machine intelligence 28, No. 4 (2006): 594-611.
Snell, Jake, Kevin Swersky, and Richard Zemel. "Prototypical networks for few-shot learning." In Advances in Neural Information Processing Systems, pp. 4077-4087. 2, Year 2017.

(Continued)

*Primary Examiner* — Neil R McLean
(74) *Attorney, Agent, or Firm* — Brooks Kushman P.C.

(57) ABSTRACT

Few-shot learning of repetitive human tasks is performed. Sliding window-based temporal segmentation is performed of sensor data for a plurality of cycles of a repetitive task. Motion alignment is performed of the plurality of cycles, the motion alignment mapping portions of the plurality of cycles to corresponding portions of other of the plurality of cycles. Categories are constructed for each of the corresponding portions of the plurality of cycles according to the motion alignment. Meta-training is performed to teach a model according to data sampled from a labeled set of human motions and the categories for each of the corresponding portions, the model utilizing a bidirectional long short-term memory (LSTM) network to account for length variation between the plurality of cycles. The model is used to perform temporal segmentation on a data stream of sensor data in real time for predicting motion windows within the data stream.

18 Claims, 7 Drawing Sheets

(56) References Cited

OTHER PUBLICATIONS

Finn, Chelsea, Pieter Abbeel, and Sergey Levine. "Model-agnostic meta-learning for fast adaptation of deep networks." In Proceedings of the 34th International Conference on Machine Learning-vol. 70, pp. 1126-1135. JMLR. org, 2017.
Petitjean, François, Alain Ketterlin, and Pierre Gançarski. "A global averaging method for dynamic time warping, with applications to clustering." Pattern Recognition 44, No. 3 (2011): 678-693.
Keogh, Eamonn, and Chotirat Ann Ratanamahatana. "Exact indexing of dynamic time warping." Knowledge and information systems 7, No. 3 (2005): 358-386.
Graves, Alex, and Jürgen Schmidhuber. "Framewise phoneme classification with bidirectional LSTM and other neural network architectures." Neural networks 18, No. 5-6 (2005): 602-610.
Vinyals, Oriol, Charles Blundell, Timothy Lillicrap, and Daan Wierstra. "Matching networks for one shot learning." In Advances in neural information processing systems, pp. 3630-3638. 2016.

* cited by examiner

FEW-SHOT LEARNING OF REPETITIVE HUMAN TASKS

TECHNICAL FIELD

The present disclosure relates to few-shot learning of repetitive human tasks.

BACKGROUND

In modern industrial manufacturing, low-cost smart sensors are commonly utilized to monitor, analyze, and improve the assembly process. In particular, body-mounted motion sensors can continuously record high-precision movement signals. Advanced machine learning systems can then be built on them to perform abnormality detection, efficiency analysis, and poka-yoke feedback etc. At each station along an assembly line, the operator needs to complete a sequence of assembling steps in a standard and timely manner. The human activity involved is often repetitive.

Few-shot learning is a task in which a classifier is adapted to accommodate new classes not seen during training, given only a few examples of each of these classes. Types of few-shot learning models include matching networks and prototypical networks. One of the issues for systems performing few-shot learning is overfitting, in which the error for a training set is driven to a small value, but new data presented to the network gives a typically-unusably large error.

SUMMARY

In one or more illustrative examples, a method for few-shot learning of repetitive human tasks is performed. Sliding window-based temporal segmentation is performed of sensor data for a plurality of cycles of a repetitive task, the plurality of cycles including a reference cycle and one or more operation cycles. Motion alignment is performed of the plurality of cycles, the motion alignment mapping portions of the plurality of cycles to corresponding portions of other of the plurality of cycles. Categories are constructed for each of the corresponding portions of the plurality of cycles according to the motion alignment. Meta-training is performed to teach a model according to data sampled from a labeled set of human motions and the categories for each of the corresponding portions, the model utilizing a bidirectional long short-term memory (LSTM) network to account for length variation between the plurality of cycles. The model is used to perform temporal segmentation on a data stream of sensor data in real time for predicting motion windows within the data stream.

In one or more illustrative examples, a system for few-shot learning of repetitive human tasks includes a memory configured to store a few-shot analysis application and motion capture data including a reference cycle and a one or more operation cycles; and a processor, operatively connected to the memory. The processor is configured to execute the few-shot analysis application to perform sliding window-based temporal segmentation of sensor data for a plurality of cycles of a repetitive task, the plurality of cycles including the reference cycle and the one or more operation cycles; perform motion alignment of the plurality of cycles, the motion alignment mapping portions of the plurality of cycles to corresponding portions of other of the plurality of cycles; construct categories for each of the corresponding portions of the plurality of cycles according to the motion alignment; perform meta-training to teach a model according to data sampled from a labeled set of human motions and the categories for each of the corresponding portions, the model utilizing a bidirectional long short-term memory (LSTM) network to account for length variation between the plurality of cycles; and use the model to perform temporal segmentation on a data stream of sensor data in real time for predicting motion windows within the data stream.

In one or more illustrative examples, a non-transitory computer readable medium comprising instructions of a few-shot analysis application that, when executed by one or more processors, cause the one or more processors to perform sliding window-based temporal segmentation of sensor data for a plurality of cycles of a repetitive task, the plurality of cycles including a reference cycle and one or more operation cycles; perform motion alignment of the plurality of cycles, the motion alignment mapping portions of the plurality of cycles to corresponding portions of other of the plurality of cycles; construct categories for each of the corresponding portions of the plurality of cycles according to the motion alignment; perform meta-training to teach a model according to data sampled from a labeled set of human motions and the categories for each of the corresponding portions, the model utilizing a bidirectional long short-term memory (LSTM) network to account for length variation between the plurality of cycles; and use the model to perform temporal segmentation on a data stream of sensor data in real time for predicting motion windows within the data stream.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

An operator at a station along an assembly line may complete a sequence of assembling steps. These assembling steps may be referred to as motion phases. An ordered sequence of the motion phases may be referred to as a cycle in the repetitive activity. An approach to provide real-time recognition for the motion phase is described. As the approach recognizes the motion phases in real-time, latency-free feedback functionality is provided to the user, which is desirable in achieving a complete poka-yoke system.

Figure 1:
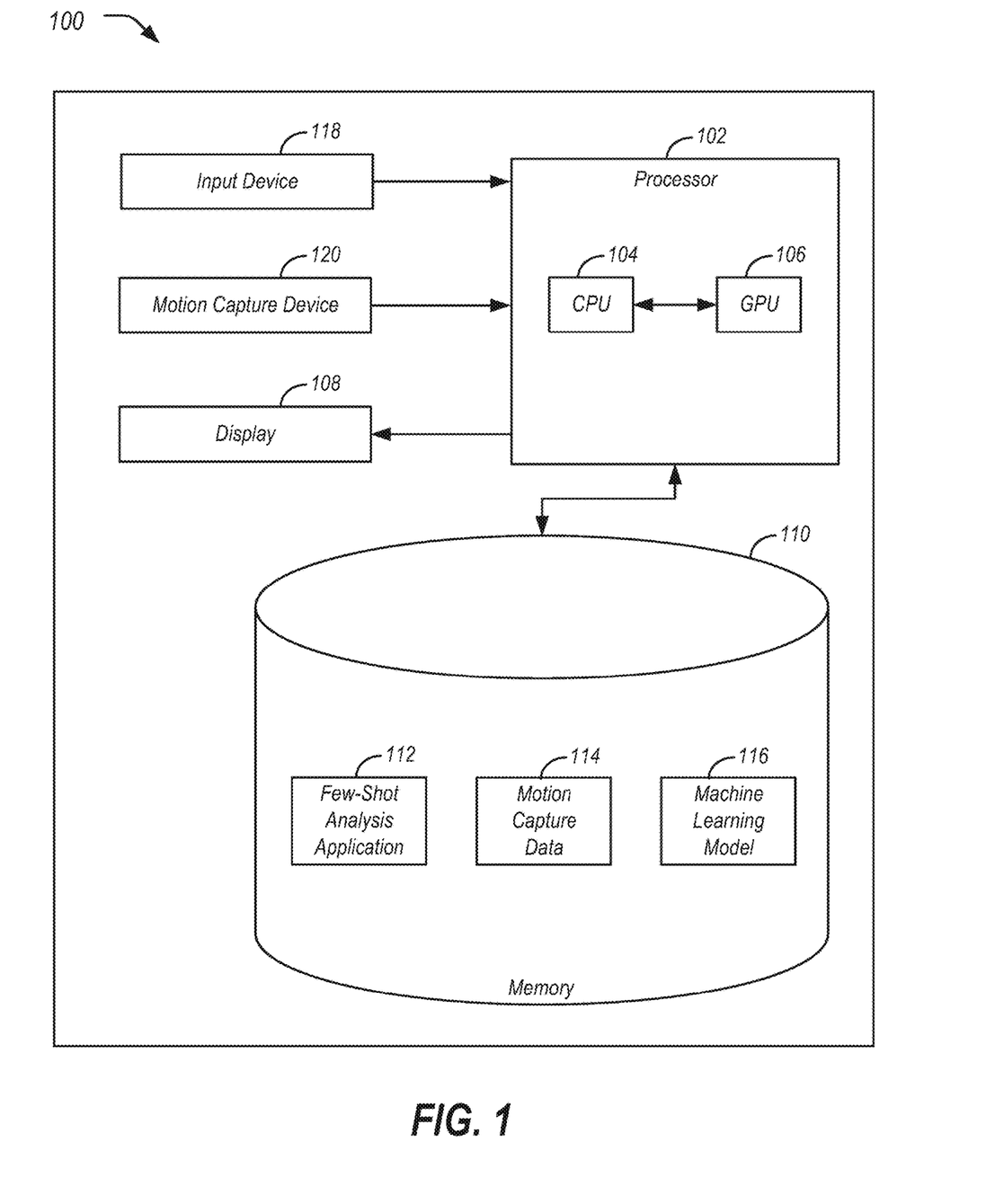
FIG. 1 illustrates a schematic diagram of an exemplary embodiment of a system for performing few-shot learning of repetitive human tasks.

FIG. 1 illustrates a schematic diagram of an exemplary embodiment of a system 100 for performing few-shot learning of repetitive human tasks. The system 100 includes a processor 102 that is operatively connected to a memory 110, input device 118, motion capture device 120, and a display device 108. While the illustrated system 100 is shown using a single computing device, other example systems 100 may include multiple computing devices performing various aspects of the few-shot learning.

In the system 100 as shown, the processor 102 includes one or more integrated circuits that implement the functionality of a central processing unit (CPU) 104 and graphics processing unit (GPU) 106. In some examples, the processor 102 is a system on a chip (SoC) that integrates the functionality of the CPU 104 and GPU 106, and optionally other components including, for example, the memory 110, a network device, and a positioning system, into a single integrated device. In other examples the CPU 104 and GPU 106 are connected to each other via a peripheral connection device such as PCI express or another suitable peripheral data connection. In one example, the CPU 104 is a commercially available central processing device that implements an instruction set such as one of the x86, ARM, Power, or MIPS instruction set families.

The GPU 106 may include hardware and software for display of at least two-dimensional (2D) and optionally three-dimensional (3D) graphics to a display device 108. The display device 108 may include an electronic display screen, projector, printer, or any other suitable device that reproduces a graphical display. In some examples, processor 102 executes software programs including drivers and other software instructions using the hardware functionality in the GPU 106 to accelerate generation and display of the graphical depictions of models of human movement and visualizations of quantitative computations that are described herein.

During operation, the CPU 104 and GPU 106 execute stored program instructions that are retrieved from the memory 110. The stored program instructions include software that control the operation of the CPU 104 and the GPU 106 to perform the operations described herein. While the system 100 depicts the processor 102 as including both the CPU 104 and GPU 106, alternative embodiments may omit the GPU 106, as for example the processor 102 may be of a server that generates output visualization data using only a CPU 104 and transmits the output visualization data to a remote client computing device that uses a GPU 106 and a display device 108 to display the data. Additionally, alternative embodiments of the processor 102 can include microcontrollers, application specific integrated circuits (ASICs), field programmable gate arrays (FPGAs), digital signal processors (DSPs), or any other suitable digital logic devices in addition to or as replacements of the CPU 104 and GPU 106.

In the system 100, the memory 110 includes both non-volatile memory and volatile memory devices. The non-volatile memory includes solid-state memories, such as NAND flash memory, magnetic and optical storage media, or any other suitable data storage device that retains data when the system 100 is deactivated or loses electrical power. The volatile memory includes static and dynamic random-access memory (RAM) that stores program instructions and data, including a few-shot analysis application 112, motion capture data 114, and a machine-learning model 116, during operation of the system 100. In some embodiments the CPU 104 and the GPU 106 each have access to separate RAM devices (e.g., a variant of DDR SDRAM for the CPU 104 and a variant of GDDR, HBM, or other RAM for the GPU 106) while in other embodiments the CPU 104 and GPU 106 access a shared memory device.

The input device 118 may include any of various devices that enable the system 100 to receive the input from a user. Examples of suitable input devices include human interface inputs such as keyboards, mice, touchscreens, voice input devices, and the like, as well. In some examples the system 100 implements the input device 118 as a network adapter or peripheral interconnection device that receives data from another computer or external data storage device, which can be useful for receiving large sets of motion capture data 114 in an efficient manner.

The motion capture data 114 refers to a plurality of records representative of the locations of at least one tracked item or portion of the item over time. For example, the motion capture data 114 may include one or more of: records of positions of a reference point on a body part over time or at set time intervals, sensor data taken over time, a video stream or a video stream that has been processed using a computer-vision technique, data indicative of the operating state of a machine over time, etc. In some cases, the motion capture data 114 may include data representative of more than one continuous movement. For instance, the motion capture data 114 may include a combination of a plurality of combined motion capture data 114 sets.

A motion capture device 120 is a device configured to generate motion capture data 114. Motion capture devices 120 may include, as some non-limiting examples: cameras, visual sensors, infra-red sensors, ultrasonic sensors, accelerometers, gyroscopes, pressure sensors, or the like. One non-limiting example of a motion capture device 120 is one or a pair of digital gloves that a user wears while performing cyclical motions. The digital gloves may include sensors that capture the motions of the user to generate the motion capture data 114 that are stored in the memory 110.

In machine learning systems, model-based reasoning refers to an inference method that operates based on a machine learning model 116 of a worldview to be analyzed. Generally, the machine learning model 116 is trained to learn a function that provides a precise correlation between input values and output values. At runtime, a machine learning engine uses the knowledge encoded in the machine learning model 116 against observed data to derive conclusions such as a diagnosis or a prediction. One example machine learning system may include the TensorFlow AI engine made available by Alphabet Inc. of Mountain View, Calif., although other machine learning systems may additionally or alternately be used. In the examples described herein, the model 116 is a few-shot learning model.

Figure 2:
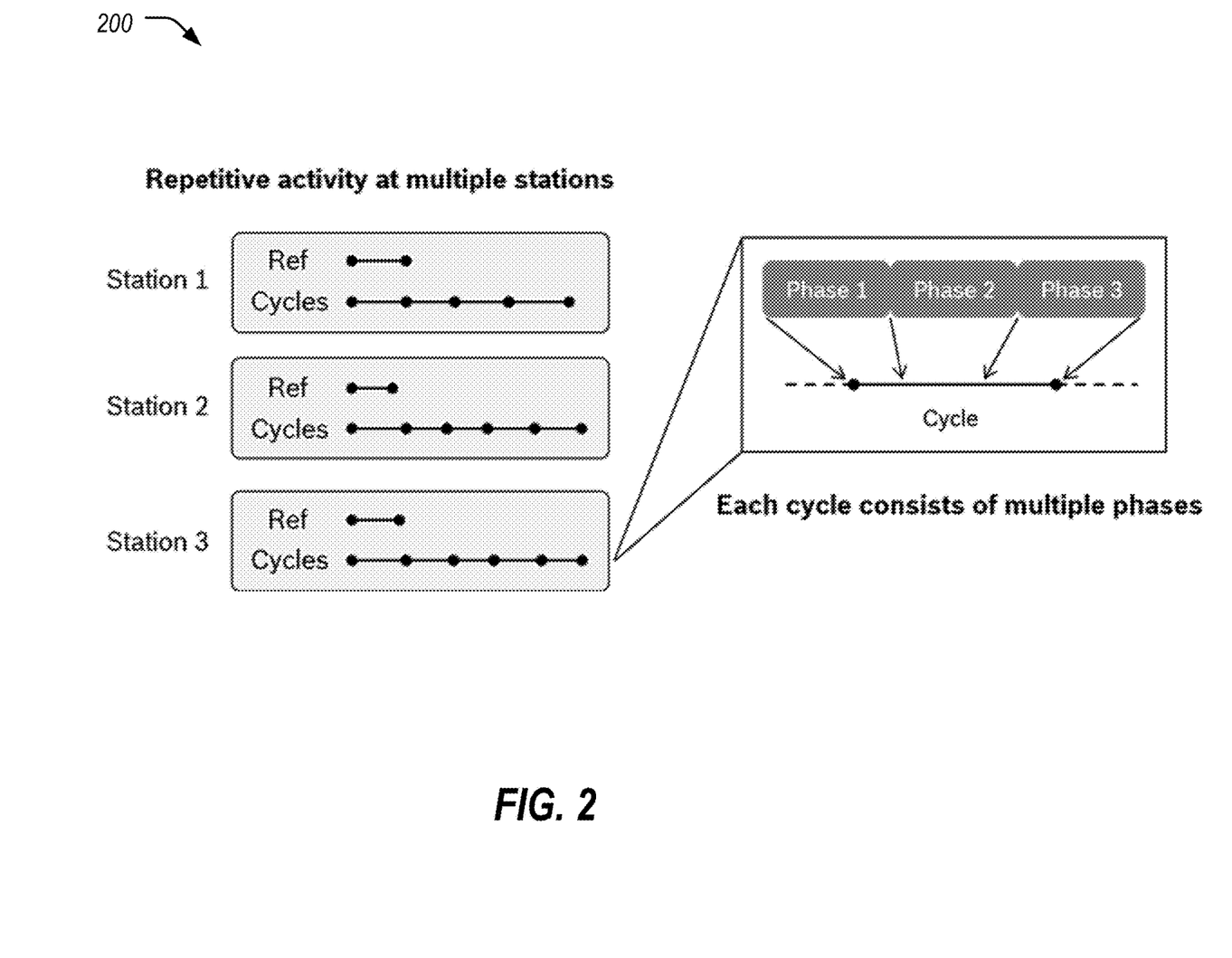
FIG. 2 illustrates an example setting for the performance of a repetitive human activity.

FIG. 2 illustrates an example setting for the performance of a repetitive human activity. At each assembly station, a few cycles (shown as a minimum of one cycle) of standard procedure is recorded as the reference to train the machine learning model 116. For instance, the motion capture device 120 may be used to capture motion capture data 114 to use as the reference movement. It should be noted that the motion activity at different stations can be completely different depending on the assembly procedure, and further that although the activity is repetitive, it can be performed at different rates and small motions are susceptible to variations.

During an inference stage, an operator repeats the assembly cycle under the observation of the motion capture device 120 and the model 116 recognizes which phase is being performed at every time step. This is challenging due to certain constraints. First, acquiring large amounts of labeled data to train the model 116 may be prohibitive due to the busy manufacturing schedule in factories and laborious labeling efforts from humans. Since minimal supervision ensures the usability of the system, a focus is placed on the challenging case where only one demonstration of the assembly procedure is available at each station. Second, assembly activities are complex and can be segmented at different granularity levels. For example, some users may divide a cycle into a few long, coarse motion phases whereas other users are interested in short, fine-grained motions. As a result, although the motion phase labels are given by the user during recording of the reference, they are, in fact, highly ambiguous. The lack of unified definition of motion patterns makes the transfer of knowledge from relevant classes difficult, challenging the typical assumption from most few-shot learning approaches (see, e.g., Snell, Jake, Kevin Swersky, and Richard Zemel. "Prototypical networks for few-shot learning." *Advances in Neural Information Processing Systems*, pp. 4077-4087. 2017; and Finn, Chelsea, Pieter Abbeel, and Sergey Levine. "Model-agnostic meta-learning for fast adaptation of deep networks." *Proceedings of the 34th International Conference on Machine Learning-Volume* 70, pp. 1126-1135. JMLR, 2017.) To tackle these challenges, motion phase recognition is formulated under the few-shot learning framework. Then a task construction method is provided based on time-series alignment in order to train the embedding network.

Figure 3:
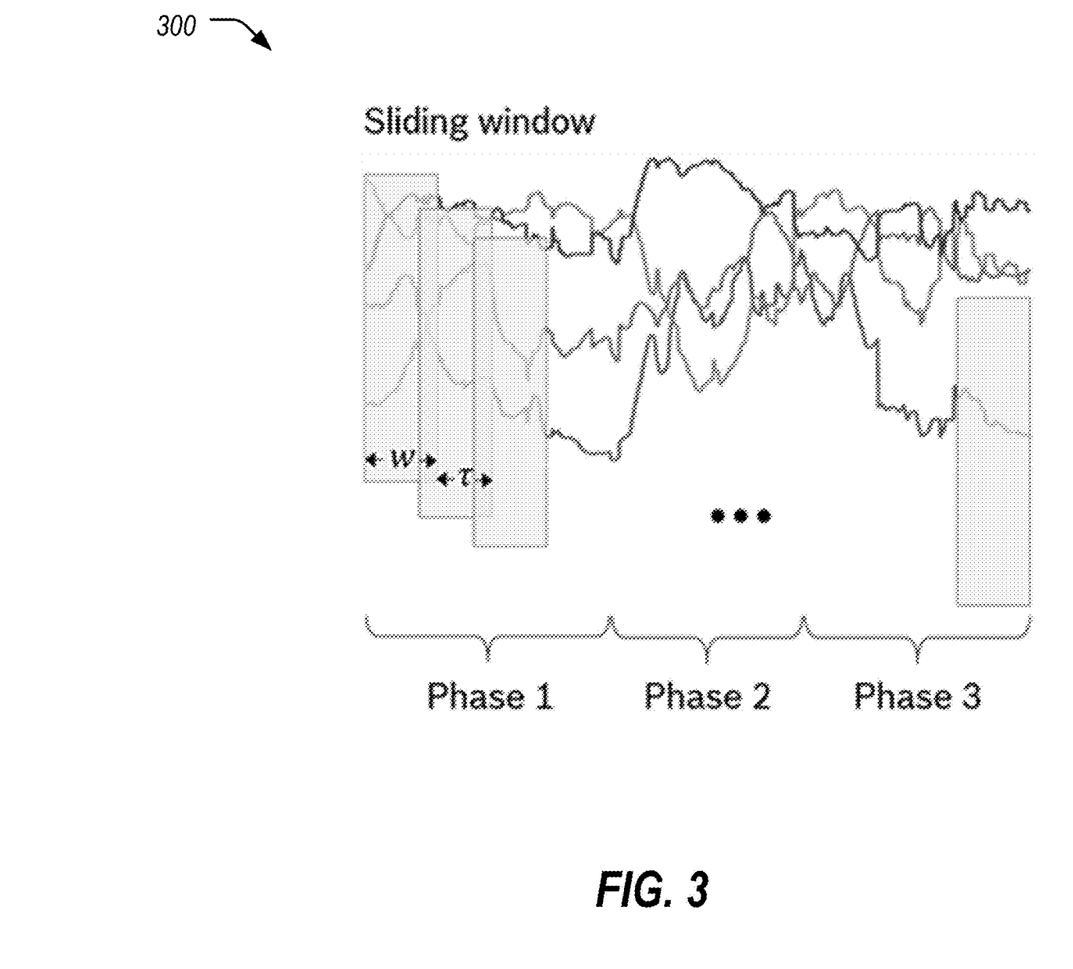
FIG. 3 illustrates an example temporal segmentation of motion activity using a sliding window approach.

FIG. 3 illustrates an example temporal segmentation of motion activity using a sliding window approach. As shown, the time series corresponds to the motion capture device 120 readings of one cycle from a considered station, which consists of three phases. Since only one demonstration (cycle) of the assembly activity is available, the training data for performing phase recognition is extremely limited. As shown, given the training cycle of motion capture data 114 for a station, first sliding window-based temporal segmentation is performed. Denoting the cycle length as l, the window length as w and the stride of the moving window as τ, the total number of resulting training samples is $(l_{std}-w)/\tau+1$, which often arrives the low-sample regime. The number of samples (windows) for each phase is also very low. Note that multiple phases exist in the cycle. Therefore, the number of training examples per class can be even lower, reaching perhaps two or three.

The assembly procedure across stations is often dramatically different (assembling a power drill versus a washing machine). Hence, the labeled motion capture data 114 from existing stations cannot be directly shared with a new station and their specific phases must be considered as different classes. This scenario fits into the few-shot setting in machine learning field, where the model 116 must learn to generalize from a few examples (see, e.g., Fei-Fei, Li, Rob Fergus, and Pietro Perona. "One-shot learning of object categories." *IEEE transactions on pattern analysis and machine intelligence* 28, no. 4 (2006): 594-611).

Figure 4:
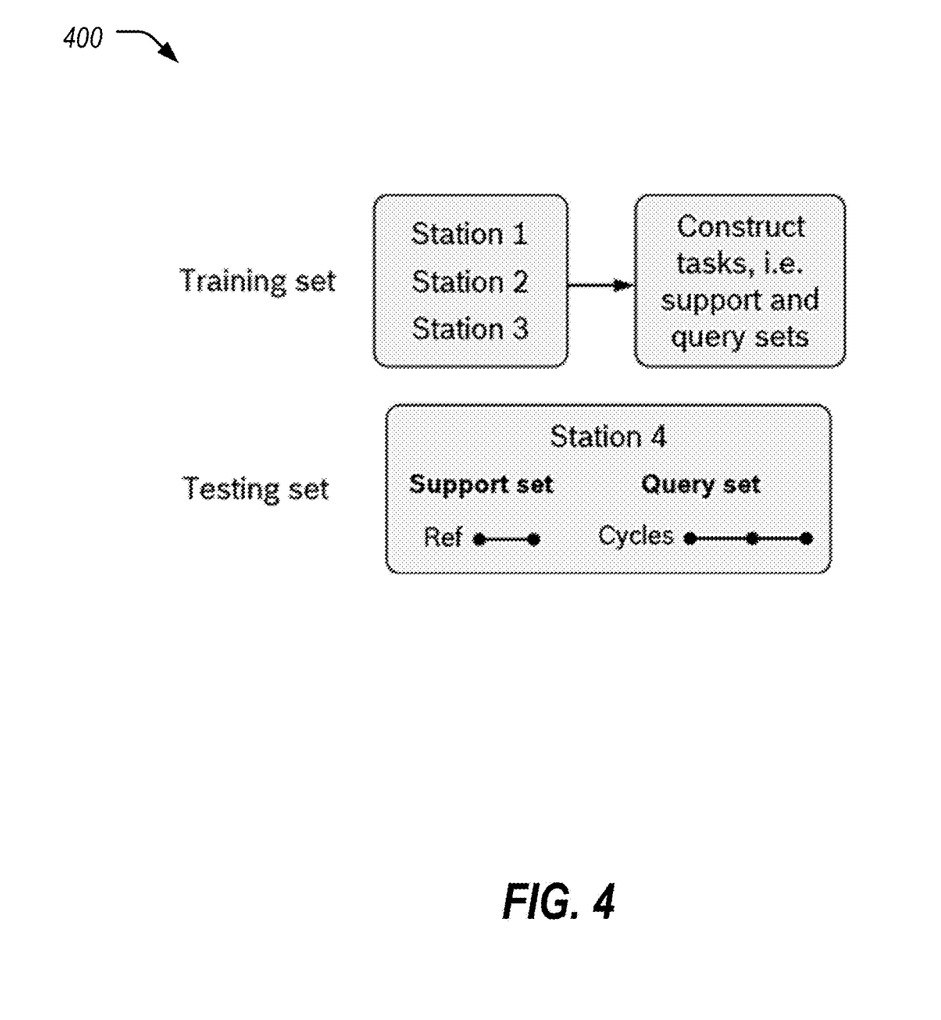
FIG. 4 illustrates an example of motion phase recognition formulated under a few-shot learning framework.

FIG. 4 illustrates an example of motion phase recognition formulated under a few-shot learning framework. The target station is where the transfer of the model 116 is to occur, and is named as testing set (Station 4 in FIG. 4). Note that the testing set contains both the reference cycle and the actual operation cycles. The reference cycle is named as support set and is where the model 116 can be fine-tuned after the transfer learning is completed. The operation cycles correspond to the query set and is where the model 116 performs recognition of the phase in real-time. The reference and operation cycles from the other stations (stations 1 to 3 in FIG. 4) is referred to as a training set. As explained in further detail, the model 116 is trained based on the entire training set and then transferred to the testing set. This procedure is referred to as meta-learning.

Directly applying a few-shot learning model, e.g., Prototypical Network (ProtoNet) (see, e.g., Snell et al.), to this framework has issues. First, although the training set is large with recordings from multiple stations, the labeled part contains only a reference of each station and is a very small fraction of the entire set. The label sparsity contradicts the typical assumption of few-shot learning, which considers that labels in the training set are abundant. Furthermore, motion procedures are ambiguous in nature; thus, it is difficult to clearly define each phase and its boundaries. Therefore, how to construct tasks from the training set, i.e., define proper support and query sets, is key to successful transfer. An effective task construction approach is proposed to resolve these challenges.

Figure 5:
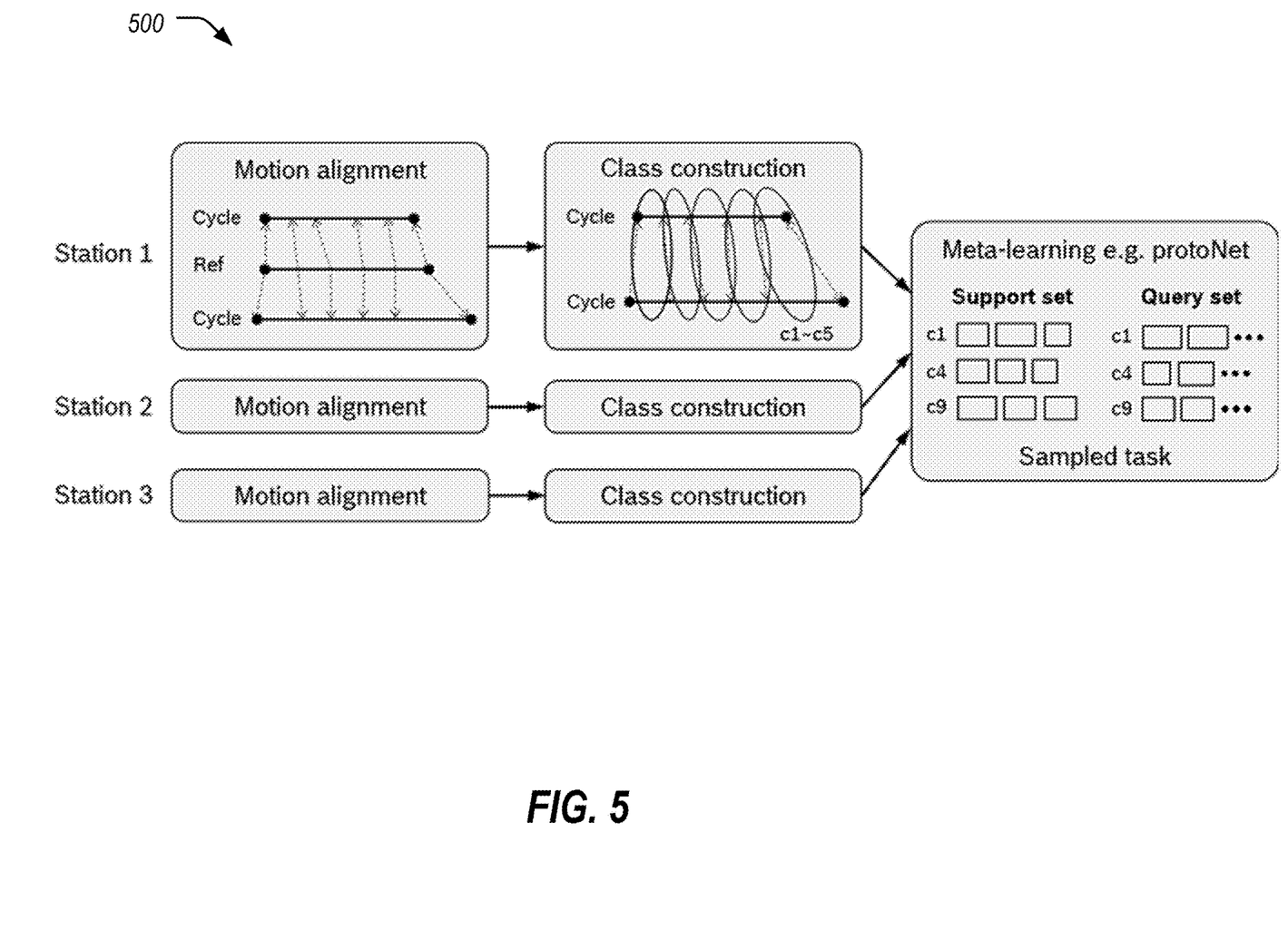
FIG. 5 illustrates an example task construction method on a training set.

FIG. 5 illustrates an example task construction method on a training set. As shown, the example is illustrated for sampling a three-way, three-shot task. A first aspect in the task construction method is to derive pseudo-labels for the unlabeled data. Intuitively, the cyclic nature of the recording indicates that there are inherent categories indicated by the correspondence between cycles. Once the cycles are aligned, phase labels can be uncovered in these cycles.

However, jointly aligning a large number of time series is hard (see, e.g., Petitjean, Francois, Alain Ketterlin, and Pierre Gançarski. "A global averaging method for dynamic time warping, with applications to clustering." *Pattern Recognition* 44, no. 3 (2011): 678-693) and some cycles might even contain abnormal motions. Thus, the reference cycle is used as an anchor in order to align all existing cycles. Specifically, denoting the reference cycle as $x_{ref}$ and the operational cycles as $\{x_n\}_{n=1}^N$, temporal alignment is performed between $x_{ref}$ and each $x_n$ using dynamic time warping (DTW) (see, e.g., Keogh, Eamonn, and Chotirat Ann Ratanamahatana. "Exact indexing of dynamic time warping." *Knowledge and information systems* 7, no. 3 (2005): 358-386). DTW is a technique for comparing sequences that may vary in speed by computing an optimal matching between discrete portions of the sequences. DTW includes computing a "warping path" that corresponds to a mapping between a portion of one sequence and a similar portion of another sequence occurring at a different time or rate. Through dynamic programming, DTW matches each time step in the reference to one or multiple steps in the cycle sequence. This is illustrated in the motion alignment block of FIG. 5.

Next, the alignment in the motion is used to construct categories. Due to the difficulty in defining a motion class and its boundaries, the atomic motion in the short sliding window is used to define a large number of classes. Specifically, first a temporal segmentation is performed, similar to as shown in FIG. 3, on the reference cycle. The stride of the moving window is set to τ=w in order to avoid overlap between categories. Denoting the kth window as $x_{ref}^{(k)}$, the DTW-matched temporal boundaries of the window within each cycle are then found. These matched motion windows are denoted as $\{x_n^{(k)}\}_{n=1}^{N}$. In the case of multiple matching steps, the step with the lowest matching cost is chosen. For each station, this procedure is followed to construct $K_s$ classes, where s denotes the station. The total number of classes is therefore $K=\Sigma_s K_s$. This process is illustrated in the class construction block of FIG. 5.

Given the obtained classes, meta-training is performed, using a similar architecture as ProtoNet in order to learn the model. One obstacle is that ProtoNet utilizes the convolutional neural network (CNN) as the modeling component and it has two disadvantages for the instant application. First, CNN is superior in capturing the spatial correlation in images but is not sufficient in modeling the temporal ordering information in the sensor time series. Second, the motion windows obtained as discussed above may vary significantly in length as a result of the rate variation in different operation cycles. CNN only accepts fixed-size input and the required padding operation may change the inherent motion information. To tackle these concerns, the modeling component in ProtoNet is replaced with a bidirectional long short-term memory (LSTM) network (see, e.g., Graves, Alex, and Jürgen Schmidhuber. "Framewise phoneme classification with bidirectional LSTM and other neural network architectures." *Neural networks* 18, no. 5-6 (2005): 602-610).

Figure 6:
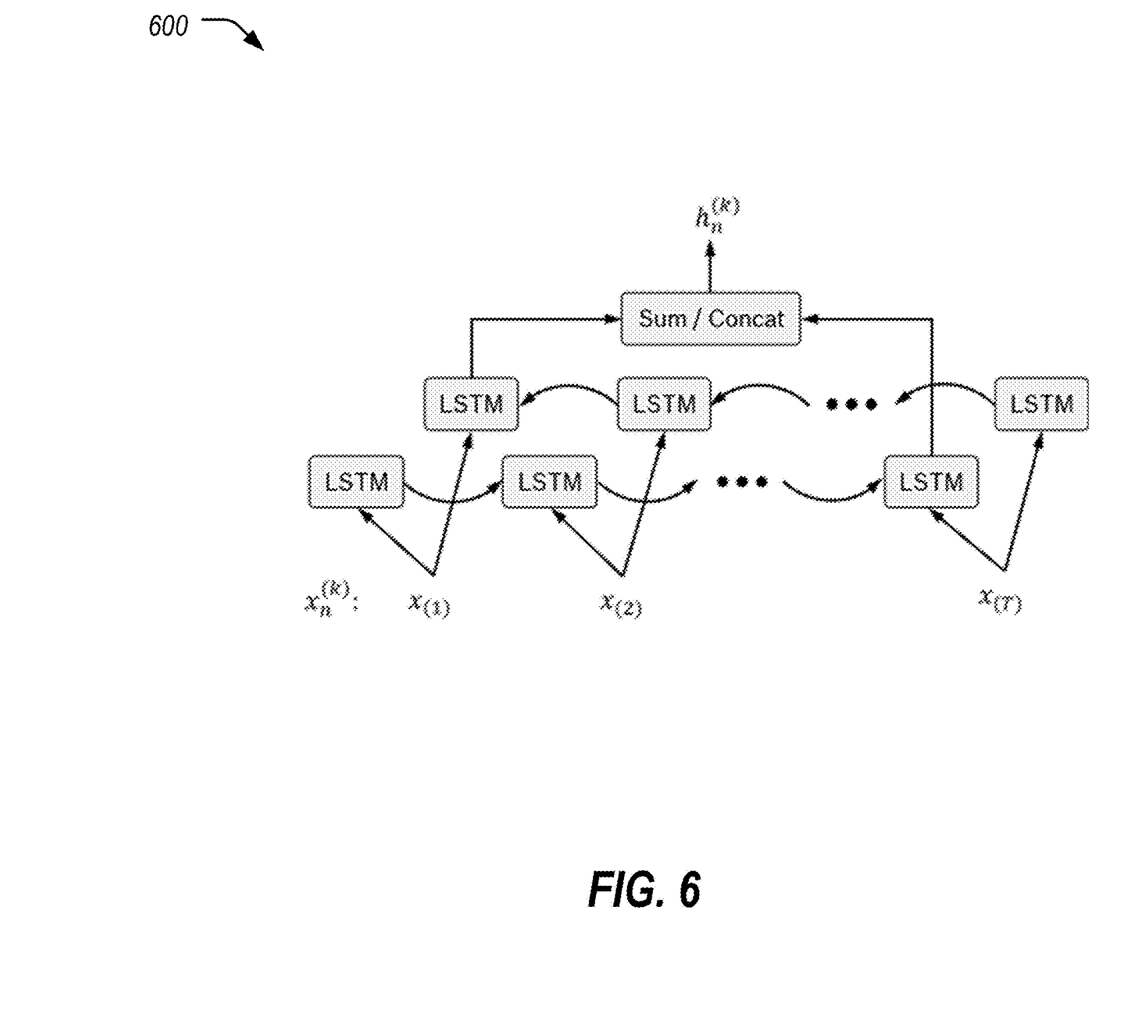
FIG. 6 illustrates a bidirectional long short-term memory architecture for calculating fixed-length embeddings.

FIG. 6 illustrates a bidirectional LSTM architecture for calculating fixed-length embeddings. As demonstrated in FIG. 6, the network consists of two LSTM cells both modeling the time series in a recurrent fashion. One cell only looks at the forward direction while the other at the backward direction, and their corresponding hidden embeddings are then summed or concatenated to form the d-dimentional fixed-length output embedding. The overall model is denoted as $f_\varphi$, with the learnable network parameters as φ.

Similar to Snell et al., in order to train the model, the prototype of each class is calculated as the mean of the class embedding vectors as follows:

$$c_k = \frac{1}{N} \sum_n f_\varphi(x_n^{(k)})$$

The predicted class distribution is then modeled as the softmax over the Euclidean distance between the query sample and all class prototypes as follows:

$$p_\varphi(y=k \mid x_{query}) = \frac{\exp(-d(f_\varphi(x_{query}), c_k))}{\Sigma_{k'} \exp(-d(f_\varphi(x_{query}), c_{k'}))}$$

Finally, the learning is performed by minimizing the negative log-probability loss regarding the true class label k:

$$J(\varphi) = -\log(p_\varphi(y=k \mid x_{query}))$$

A key procedure in most meta-learning approaches is to sample large quantities of few-shot tasks from the meta-training set (see, e.g., Snell et al. and Vinyals, Oriol, Charles Blundell, Timothy Lillicrap, and Daan Wierstra. "Matching networks for one shot learning." *Advances in neural information processing systems*, pp. 3630-3638. 2016). Each sampled task consisting of C classes and M samples per class. An example with C=3 and M=3 is shown in the meta-learning block of FIG. 4. The sampling process is performed as follows: at each training episode, C classes are first sampled from the total number of K classes. Then, for each of the selected classes, M samples are randomly sampled to construct the support set. From the remaining data of unselected classes, Q random samples are randomly retrieved to construct the query set. Given the support and query set, J(φ) can be calculated and the model parameters can be updated by backpropagation.

As mentioned before, the network $f_\varphi$ is meta-trained on all existing stations (e.g., station 1-3 of FIG. 5), but needs to be deployed on a new station with only the reference as support set (e.g., station 4 of FIG. 5). The station specific model can be obtained by fine-tuning $f_\varphi$. Specifically, for the target station, temporal segmentation is performed on the reference cycle, $f_\varphi$ is trained further with the user-defined phase labels. The training can be stopped early to prevent overfitting, especially when the motions differ significantly from existing stations.

During runtime, temporal segmentation is performed on the operation data stream in real time and the prediction on the motion window is made according to $p_\varphi(y=k \mid x_{query})$. The transfer of knowledge through the meta-training stage tackles the limitation of low training data and improves the model generalization towards new operation cycles.

Thus, the recognition of repetitive human activities is formulated as few-shot model learning under low data regime. The inherent categories of repetitive human activities are uncovered by temporal alignment. Knowledge of human motions is transferred from a large labeled set to novel categories by meta-training. Knowledge of human motions is also transferred from a large labeled set to novel categories by fine-tuning. This solution further improves the temporal transfer in few-shot learning by utilizing a bidirectional LSTM model.

Figure 7:
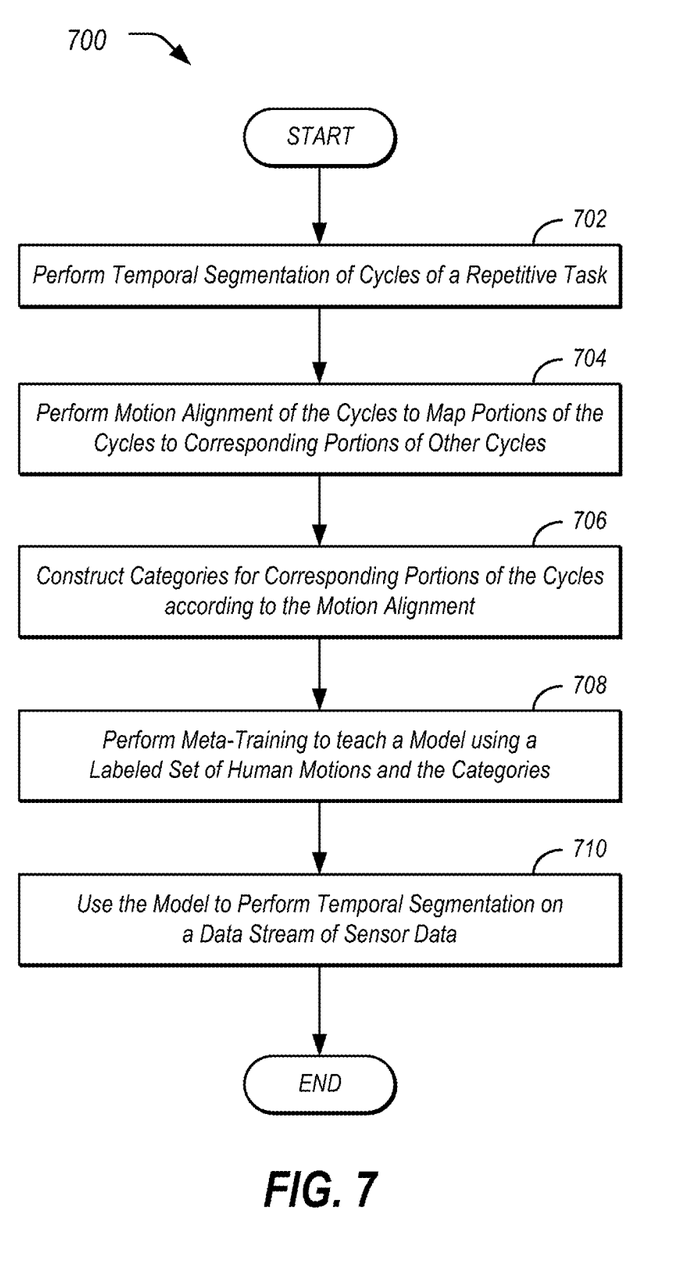
FIG. 7 illustrates an example process for performing few-shot learning of repetitive human tasks.

FIG. 7 illustrates an example process 700 for performing few-shot learning of repetitive human tasks. In an example, the process 700 may be performed by the system 100, using the approach discussed in detail herein.

At operation 702, the system 100 performs sliding window-based temporal segmentation of sensor data for a plurality of cycles of a repetitive task. The plurality of cycles may include a reference cycle and one or more operation cycles.

At operation 704, the system 100 performs motion alignment of the plurality of cycles. The motion alignment may map portions of the plurality of cycles to corresponding portions of other of the plurality of cycles. At operation 706, the system 100 constructs categories for each of the corresponding portions of the plurality of cycles according to the motion alignment.

At operation 708, the system 100 performs meta-training to teach a model according to data sampled from a labeled set of human motions and the categories for each of the corresponding portions. The model may utilize a bidirectional long short-term memory (LSTM) network to account for length variation between the plurality of cycles. At operation 710, the system 100 uses the model to perform temporal segmentation on a data stream of sensor data in real time for predicting motion windows within the data stream.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for few-shot learning of repetitive human tasks, the method comprising:
    performing sliding window-based temporal segmentation of sensor data for a plurality of cycles of a repetitive task, the plurality of cycles including a reference cycle and one or more operation cycles;
    performing motion alignment of the plurality of cycles, the motion alignment mapping portions of the plurality of cycles to corresponding portions of other of the plurality of cycles;
    constructing categories for each of the corresponding portions of the plurality of cycles according to the motion alignment;
    performing meta-training to teach a model according to data sampled from a labeled set of human motions and the categories for each of the corresponding portions, the model utilizing a bidirectional long short-term memory (LSTM) network to account for length variation between the plurality of cycles; and
    using the model to perform temporal segmentation on a data stream of sensor data in real time for predicting motion windows within the data stream.

2. The method of claim 1, wherein the motion alignment is performed using dynamic time warping (DTW) to compute an optimal matching between discrete portions of the plurality of cycles.

3. The method of claim 1, wherein the motion alignment is performed using the reference cycle as an anchor to align the one or more operation cycles.

4. The method of claim 1, wherein LSTM network includes a first cell looking in a forward direction and a second cell looking in a backward direction, wherein hidden embeddings from each of the first cell and the second cell are combined to form a fixed-length output embedding.

5. The method of claim 1, wherein the model is trained by:
    calculating a class prototype of each of the categories as a mean of embedding vectors for the category;
    modeling a predicted class distribution using a softmax function over a Euclidean distance between query samples and the class prototype; and
    learning by minimizing a negative log-probability loss regarding a true class label for the category.

6. The method of claim 1, wherein the sensor data is received from a digital glove.

7. A system for few-shot learning of repetitive human tasks, comprising:
    a memory configured to store a few-shot analysis application and motion capture data including a reference cycle and a one or more operation cycles; and
    a processor, operatively connected to the memory, and configured to execute the few-shot analysis application to
        perform sliding window-based temporal segmentation of sensor data for a plurality of cycles of a repetitive task, the plurality of cycles including the reference cycle and the one or more operation cycles;
        perform motion alignment of the plurality of cycles, the motion alignment mapping portions of the plurality of cycles to corresponding portions of other of the plurality of cycles;
        construct categories for each of the corresponding portions of the plurality of cycles according to the motion alignment;
        perform meta-training to teach a model according to data sampled from a labeled set of human motions and the categories for each of the corresponding portions, the model utilizing a bidirectional long short-term memory (LSTM) network to account for length variation between the plurality of cycles; and
        use the model to perform temporal segmentation on a data stream of sensor data in real time for predicting motion windows within the data stream.

8. The system of claim 7, wherein the motion alignment is performed using dynamic time warping (DTW) to compute an optimal matching between discrete portions of the plurality of cycles.

9. The system of claim 7, wherein the motion alignment is performed using the reference cycle as an anchor to align the one or more operation cycles.

10. The system of claim 7, wherein LSTM network includes a first cell looking in a forward direction and a second cell looking in a backward direction, wherein hidden embeddings from each of the first cell and the second cell are combined to form a fixed-length output embedding.

11. The system of claim 7, wherein the processor is further configured to execute the few-shot analysis application to train the model by operations including to:
    calculate a class prototype of each of the categories as a mean of embedding vectors for the category;
    model a predicted class distribution using a softmax function over a Euclidean distance between query samples and the class prototype; and learn by minimizing a negative log-probability loss regarding a true class label for the category.

12. The system of claim 7, wherein the sensor data is received from a digital glove.

13. A non-transitory computer readable medium comprising instructions of a few-shot analysis application that, when executed by one or more processors, cause the one or more processors to:
perform sliding window-based temporal segmentation of sensor data for a plurality of cycles of a repetitive task, the plurality of cycles including a reference cycle and one or more operation cycles;
perform motion alignment of the plurality of cycles, the motion alignment mapping portions of the plurality of cycles to corresponding portions of other of the plurality of cycles;
construct categories for each of the corresponding portions of the plurality of cycles according to the motion alignment;
perform meta-training to teach a model according to data sampled from a labeled set of human motions and the categories for each of the corresponding portions, the model utilizing a bidirectional long short-term memory (LSTM) network to account for length variation between the plurality of cycles; and
use the model to perform temporal segmentation on a data stream of sensor data in real time for predicting motion windows within the data stream.

14. The non-transitory computer readable medium of claim 13, wherein the motion alignment is performed using dynamic time warping (DTW) to compute an optimal matching between discrete portions of the plurality of cycles.

15. The non-transitory computer readable medium of claim 13, wherein the motion alignment is performed using the reference cycle as an anchor to align the one or more operation cycles.

16. The non-transitory computer readable medium of claim 13, wherein LSTM network includes a first cell looking in a forward direction and a second cell looking in a backward direction, wherein hidden embeddings from each of the first cell and the second cell are combined to form a fixed-length output embedding.

17. The non-transitory computer readable medium of claim 13, wherein the medium further comprises instructions of the few-shot analysis application that, when executed by the one or more processors, cause the one or more processors to:
calculate a class prototype of each of the categories as a mean of embedding vectors for the category;
model a predicted class distribution using a softmax function over a Euclidean distance between query samples and the class prototype; and
learn by minimizing a negative log-probability loss regarding a true class label for the category.

18. The non-transitory computer readable medium of claim 13, wherein the sensor data is received from a digital glove.

* * * * *